(12) United States Patent
Megler et al.

(10) Patent No.: US 8,560,531 B2
(45) Date of Patent: Oct. 15, 2013

(54) SEARCH TOOL THAT UTILIZES SCIENTIFIC METADATA MATCHED AGAINST USER-ENTERED PARAMETERS

(75) Inventors: Veronika Margaret Megler, Oak Grove, OR (US); David Maier, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 13/175,611

(22) Filed: Jul. 1, 2011

(65) Prior Publication Data
US 2013/0006976 A1   Jan. 3, 2013

(51) Int. Cl.
G06F 17/30 (2006.01)

(52) U.S. Cl.
USPC .......................................................... 707/723

(58) Field of Classification Search
USPC ......................................... 707/725, 723, 724
See application file for complete search history.

(56) References Cited

U.S. PATENT DOCUMENTS

| | | | |
|---|---|---|---|
| 6,546,388 B1 | 4/2003 | Edlund et al. | |
| 6,718,324 B2 | 4/2004 | Edlund et al. | |
| 6,859,803 B2 | 2/2005 | Dagtas et al. | |
| 7,644,072 B2 | 1/2010 | Budzik et al. | |
| 7,657,518 B2 | 2/2010 | Budzik et al. | |
| 7,752,199 B2 | 7/2010 | Farrell | |
| 2009/0132516 A1 | 5/2009 | Patel et al. | |
| 2009/0216742 A1 | 8/2009 | Coffman et al. | |
| 2009/0248658 A1 | 10/2009 | Mika | |
| 2010/0191722 A1* | 7/2010 | Boiman et al. | 707/723 |
| 2011/0040752 A1 | 2/2011 | Svore et al. | |
| 2011/0173193 A1* | 7/2011 | Ahn et al. | 707/725 |
| 2012/0158704 A1* | 6/2012 | Lacal | 707/723 |

OTHER PUBLICATIONS

Lykke, M.-et al.; "Developing a Test Collection for the Evaluation of Integrated Search"; Advances in Information Retrieval; 32 Euro Conf.; ECIR 2010; pp. 627-630; 2010.
Jianhan, Z.-et al.; "DYNIQX: a novel meta-searchengine for the Web"; Intern'l Journal of Information Studies; vol. 1, No. 1, pp. 3-27; Jan. 2009.
Ochoa, X.-et al.; "Use of Contextualized Attention Metadata for Ranking and Recommending Learning Objects"; CAMA '06;Arlington, VA, USA.; Nov. 11, 2006.
Soon, KH.-et al.; "Supporting Semantics-based Metadata Discovery with MetaSys"; CZEN '09; Central Zone Exploratory Network; Pennsylvania State Univ.; 2009.

(Continued)

*Primary Examiner* — Robert Beausoliel, Jr.
*Assistant Examiner* — Alexandria Bromell
(74) *Attorney, Agent, or Firm* — Patents on Demand P.A.; Brian K. Buchheit; Scott M. Garrett (57) ABSTRACT

A method for providing proximate dataset recommendations can begin with the creation of metadata records corresponding to datasets that represent scientific data by a scientific dataset search tool. The metadata records can conform to a standardized structural definition, and may be hierarchical. Values for the data elements of the metadata records can be contained within the datasets. Metadata records with a value that is proximate to a user-entered search parameter can be identified. A proximity score can be calculated for each identified metadata record. The proximity score can express a relevance of the corresponding dataset to the user-entered search parameters. The identified metadata records can be arranged in descending order by the calculated proximity rating, creating a list of proximate dataset results. The proximate dataset results can be presented within a user interface.

26 Claims, 4 Drawing Sheets

(56) References Cited

OTHER PUBLICATIONS

Gey, F.-et al.; "Advanced Search Technologies for Unfamiliar Metadata"; 22nd Annual Intern'l ACM SIGIR Conference on R&D (SIGIR'99); 1999.

Wason, TD.-et al.; "An Intelligent Method for Searching Metadata Spaces"; Metadata and Organizing Educational Resources on the Internet; 2001.

Wason, TD.-et al.; "Structured Metadata Spaces"; Journal of Internet Cataloging; pp. 263-278; 2000.

* cited by examiner

SEARCH TOOL THAT UTILIZES SCIENTIFIC METADATA MATCHED AGAINST USER-ENTERED PARAMETERS

FEDERAL RIGHTS

The U.S. Government has certain rights to embodiments of the invention based on the National Science Foundation grant number OCE 0424602.

BACKGROUND

The present invention relates to the field of data analysis and, more particularly, to a search tool for finding and ranking datasets having meta-data (e.g., scientific data) associated using user-entered parameters (e.g., numerical ranges of the metadata).

The scientific community has continually generated large volumes of data over the years. Advances in data collection devices (i.e., deployed sensors that transmit data to a central point) have streamlined and automated tasks that once required manual attention, increasing the rate at which data is collected and analyzed. For example, the Center for Coastal Margin Observation and Prediction (CMOP) has accumulated terabytes of data from various fixed and mobile deployed sensors.

While this expansive collection of data provides researchers with a wealth of information, it has become increasingly time-consuming and difficult to find data relevant to a scientist's research problem. One example is data close to a specified time and location, which is important when assessing the impact of one's findings in a broader or narrower context. For example, a microbiologist may look for data near the Astoria Bridge in June of 2009 in order to put a collected water sample from that location into physical context. In another example, the microbiologist may look for a variable such as nitrogen within a specific range of values.

Locating and scanning each potentially relevant dataset (i.e., collection of related data points) not only requires time, but an understanding of each dataset's storage location, access methods, and format as well. Often, the researcher is unaware of or unable to identify relevant datasets. For example, datasets from a sensor that is geospatially-fixed (i.e., stationary at a known location) at the Astoria Bridge (or location of interest) must still be searched for the appropriate time interval. Datasets collected by mobile sensors require additional time to correlate the position of the sensor with respect to the Astoria Bridge and determine if the distance at which the dataset was collected is acceptable, before the dataset is examined for the time interval.

While many tools exist to analyze and/or visual data, these tools must be told a dataset and data ranges to analyze/visualize. While such tools allow the researcher to find needles in a haystack, the researcher is still left with the problem of which haystacks are most likely to contain the needles they want. That is, existing tools do not address the problem of assisting the researcher in discovering datasets that have the potential to be relevant to a specified time and/or place (i.e., datasets that are "close" to the query in time and/or place).

More specifically, existing tools are largely based on text matches. That is, content is indexed for keywords, and these keywords are matched to the indexed information. These types of matches do not translate well for scientific data, where a searcher is often most interested in results within a bound numeric range based on the gathered scientific data (or within a bound subset of a larger mathematically expressible set).

BRIEF SUMMARY

One aspect of the present invention can include a method for providing proximate dataset recommendations. Such a method can begin with the creation of metadata records corresponding to datasets that represent scientific data by a scientific dataset search tool. The metadata records can conform to a standardized structural definition, whether or not the data represented does so. Values for the data elements of the metadata records can be determined from the corresponding dataset. Metadata records that have values that are proximate to one or more user-entered search parameter can be identified. The proximity can be determined with respect to the radius of the range represented by the corresponding user-entered search parameters. A proximity score can then be calculated for each identified metadata record. The proximity score can express a relevance of the corresponding dataset to the user-entered search parameters. The identified metadata records can be arranged in descending order by the calculated proximity rating, creating a list of proximate dataset results. The proximate dataset results can then be presented within a user interface.

Another aspect of the present invention can include a system for providing proximate dataset recommendations. Such a system can include user-entered search parameters, metadata records, and a scientific dataset search tool. The user-entered search parameters can define, for example, a interval, a time interval or a spatial location for the search. The metadata records can correspond to datasets representing scientific data. Each metadata record can contain the bounds of the dataset and a unique identifier for the dataset. The scientific dataset search tool can be configured to generate a listing of proximate dataset results for the user-entered search parameters based on the metadata records. The order of the proximate dataset results can be based upon the proximity score of the metadata record. The proximity score can express the relevance of the dataset to the user-entered search parameters.

DETAILED DESCRIPTION

The present invention discloses a solution for identifying datasets of scientific data through a Web search (or other database search). Scientific data can be data characterized by numerical values or categorical data. Categorical data refers to a mathematically expressible set of items having an order or structure, which can be bound to include/exclude subsets of the items. That is, categorical data can refer to a structure where defined subsets of enumerable items are contained within a larger set. Categorical data, for example, can have a hierarchical structure. For instance, a category of "photosynthesis genes" can be a summary of a specific subset of genes.

Regardless of the type of scientific data being searched, the data sets have associated metadata that summarize sets of the data. That is, the metadata can define searchable parameters, which can represent significant characteristics of a larger set of underlying data. Thus, the metadata can be searched, instead of the underlying data, which determines (with a high probability) whether a larger set of items satisfy search criteria or not. This approach is significantly more resource efficient than having to search the underlying data of the entire data set.

In one embodiment, a multi-stage search can be conducted, where in an initial stage a reduced data set is generated from the data set, where the reduced data set includes those items having metadata satisfying user-specified constraints. In a second stage, the underlying data of the reduced data set can be searched for additional user-specified constraints. Since each metadata value corresponds to a larger set of underlying data values, significantly fewer items have to be searched to achieve the ultimate result. For instance, the reduced data set can include data items gathered within a specific date range, within a specific spatial region, and/or belonging to a specific category of scientific data. The reduced data set can represent a more manageable quantity of data items, which can be reasonably searched, where a high probability (or at least a statistically reasonable probability) exists that the desired data items per the search parameters are included in the reduced data set. This high probability that the desired data items are present in the reduced data set is dependent on inherent characteristic of scientific data that facilitates grouping. For example, numerical values can be easily grouped within a range, where the metadata can specify that specific range. Similarly, categorical data can be grouped according to definable categories (i.e., the parent set of data items can be decomposed into a plurality of meaningful subsets of data items, each of which include multiple data items).

Scientific data is often gathered by sensors, which indicate values of one or more conditions proximate to the sensor at a given date and time. Thus, important metadata of the underlying data sets often includes geospatial and temporal data that represents where and when the sensor readings are obtained. Other data is often dependent on the type of sensor and readings being obtained. For example, if the sensor is deployed in an ocean, relevant numeric data (for incorporation into the metadata) can include temperature, salt content (or quantities of some other measured substance), flow rate. Relevant categorical data can include species names, gene or transcript identifiers, etc. Other data is generated by scientific models that simulate systems being observed. Information gathered directly from sensors can be referred to herein as raw scientific data.

Searching this raw scientific data using standard techniques can be impractical. That is, crawling inclusive data in a single dimension (that is not pre-indexed or summarized) can be extensively time consuming. Performing significant searches against these ranges against multiple dimensions within defined constraints can be even more difficult. This is especially true when combining data from a large set of sensors to track real world phenomena. The problem is often referred to as data overload, which comes from an increasingly large set of deployed sensors and monitoring applications, which produce streaming data that is live, continuously changing, structurally invariant, and voluminous. The problem is not a lack of data, but in not being able to intelligently consume and digest the importance expressed by this data.

This type of streaming or generated data, referred to herein as scientific data is fundamentally different from traditional captured data sets in many important ways, which make digesting this information problematic; thereby leading to the data overload problems. When working with scientific data, extraction, transformation, and load processes are not needed (or use of conventional ones are not appropriate) as streaming data is constantly being loaded. In other words, there are no updates, only inserts (in huge quantities) to the data set. Next, analytics of scientific data must be performed in or close to the underlying database programmatically rather than relying on ad hoc queries (e.g., standard SQL queries) and other existing tools. Additionally, time, relative or absolute locations and multiple dimensional data sets (characteristics of scientific data) are different to express and consume in an easy to digest manner.

The disclosure provides a solution where scientific data is indexed (and/or summarized) within metadata. This metadata is compared during a search against a set of user-entered parameters. Upon receipt of user-entered search parameters, a scientific dataset search tool can identify metadata records that are close to the user-entered search parameters. In one embodiment, the user-entered search parameters can represent soft boundaries, which can be exceeded (yet a biasing formula prefers values within the search parameter established ranges), which permits particularly relevant results close to the boundaries to be returned (as opposed to being automatically excluded, which is the case with hard boundaries). In one embodiment, a proximity score can be calculated for each metadata record to numerically express the proximity of the metadata record to the user-entered parameters. The identified metadata records can then be arranged by their proximity scores, in descending order, and presented to the user. In one embodiment, the proximity scores can be used for filtering records (as opposed to or in addition to being used for sorting/ranking purposes.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
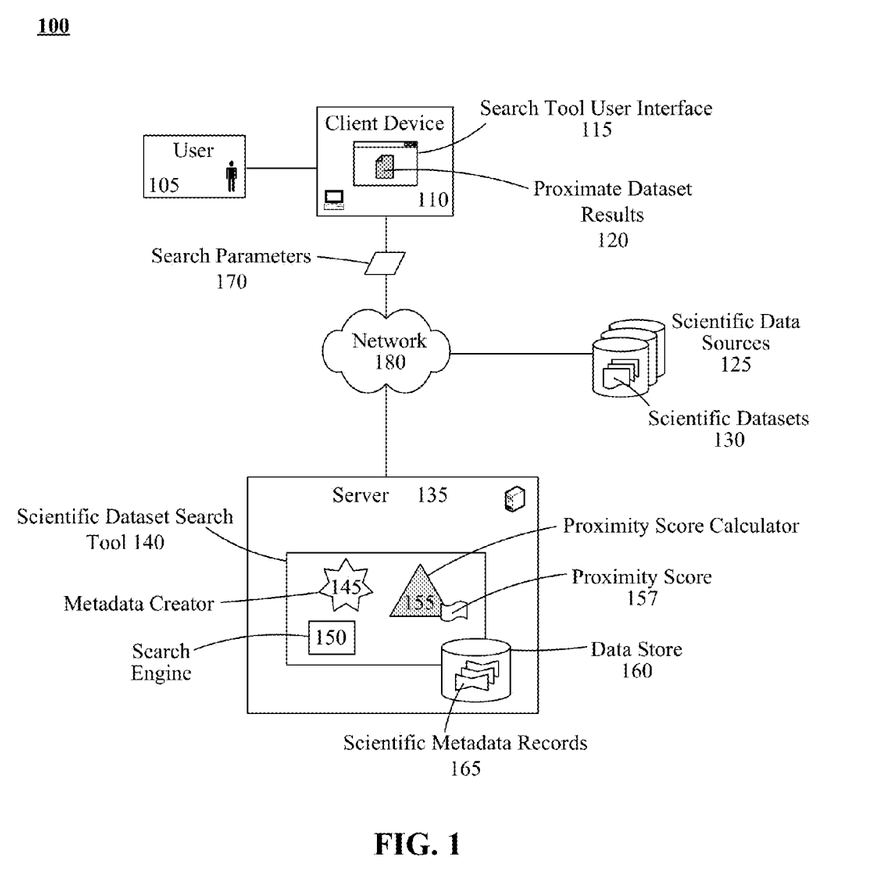
FIG. 1 is a schematic diagram illustrating a system that utilizes a scientific dataset search tool to provide a user with a listing of proximate dataset results for entered search parameters in accordance with embodiments of the inventive arrangements disclosed herein.

FIG. 1 is a schematic diagram illustrating a system 100 that utilizes a scientific dataset search tool 140 to provide a user 105 with a listing of proximate dataset results 120 for entered search parameters 170 in accordance with embodiments of the inventive arrangements disclosed herein. In system 100, the user 105 can enter search parameters 170 into the search tool user interface 115. The search parameters 170 define a range, target, variance and/or other mathematically expressible constraint upon the scientific data set 130.

For example, the search parameters 170 can be values for location and time-related variables and/or limits used by the scientific dataset search tool 140 to determine the proximate dataset results 120. For instance, geospatial/temporal search parameters (e.g., parameters 170 in one embodiment) can express that the search is to be conducted for data collected in June of 2009 (temporal parameter) within 5 km (geospatial limit) of the Astoria Bridge (geospatial parameter). Although geospatial/temporal parameters are used throughout examples in this disclosure (as they are common examples of search parameters 170 applicable to scientific datasets 130), the disclosure is not to be construed as limited in this regard and any set of one or more numerically expressible parameters 170 can be utilized. Additionally, any parameters defining a subset (e.g., category) of a larger dataset of categorized data can be one of the search parameters 170.

It should be understood that in one embodiment, the search parameters 170 are metadata parameters for other content. In one embodiment, the metadata parameters can represent summaries, mathematically (e.g., via numeric ranges or sets expressible via set theory) expressible characteristics of larger more complex sets of corresponding data set items. Regardless, the metadata greatly facilitates searching, making it significantly more efficient (and less resource consuming) than use of raw scientific data (e.g., the scientific datasets 130 to which the metadata corresponds).

In one embodiment, a matching of the search parameters 170 against the metadata 165 can be a first stage (or an intermediate stage) in a multi-stage search strategy against the scientific datasets 130. That is, matching the parameters to the metadata 165 can significantly reduce the relevant datasets 130 and/or searches 125. A refinement search, such as one that utilizes the numeric content of the scientific datasets 130 themselves, can further target relevant data for a search within the reduced (by using parameters 170) dataset. For example, when the metadata represents a summary or approximation of a larger set of corresponding values 130, an initial search against the summary can quickly reduce a volume of data that is to be considered, where the actual data (more detailed than the summary) can be used to determine end results.

Further, search parameters 170 can be used as filtering (or sorting) criteria for a search result set, such as a filter for results from a Web search from a Web search engine. In other words, a search can be performed using content criteria (key words, Boolean logic, etc.), which is also (concurrently) constrained by metadata characteristic of the content, which includes geospatial and/or temporal metadata characteristics, as detailed herein. The metadata characteristics can include numeric ranges or their equivalents (e.g., dates and date ranges can be treated numerically), categorical data, etc.

The search tool user interface 115 can be a graphical user interface that facilitates the user's 105 interaction with the scientific dataset search tool 140. The search tool user interface 115 can be configured to operate upon a client device 110. Client device 110 can represent a variety of computing devices configured to support operation of the search tool user interface 115 and communicate with the scientific dataset search tool 140 over a network 180.

The scientific dataset search tool 140 can operate upon a server 135 accessible by the network 180. The server 135 can represent the hardware and/or software components necessary to support the functionality of the tool 140.

In another contemplated embodiment, the scientific dataset search tool 140 can be an integrated component of a data processing system or data analysis tool. The data processing system can be a database system, for example, which in various embodiments include relational database management systems (RBDMS), object oriented databases, NoSQL databases, and the like.

The scientific dataset search tool 140 can represent a software application configured to generate the proximate dataset results 120 for the received search parameters 170. The scientific dataset search tool 140 can include a metadata creator 145, a search engine 150, a proximity score calculator 155, and a collection of scientific metadata records 165 contained in a data store 160.

The metadata creator 145 can be a component of the scientific dataset search tool 140 that creates the scientific metadata records 165. A scientific metadata record 165 can be a simple abstraction that contains basic information about a corresponding scientific dataset 130 that is relevant to the scientific dataset search tool 140.

For example, a scientific metadata record 165 can include the temporal bounds of the dataset, represented as a minimum and maximum time, the spatial bounds of the dataset, represented by a basic geometry type, and a unique identifier for the dataset. It can also include a summary of each variable contained within the dataset. In this context, a variable is a measured or calculated value.

A scientific data source 125 can represent the electronic storage location of the scientific datasets 130. The scientific data sources 125 can be accessible by the search tool 140 over network 180. A scientific dataset 130 can represent data collected having a geospatial and temporal context like environmental conditions. The dataset 130 can have multiple dimensions of numerical ranges associated with it (e.g., geospatial dimension, temporal dimension, temperature dimension, pressure dimension, value dimension, etc.) The exact numerical ranges (and/or dimensions) for a dataset can vary depending on the nature of the scientific data itself and/or depending on the nature of a set of sensors used to gather the scientific data. Categorical data of the scientific dataset 130 can be treated as an equivalent of numerical ranges (i.e., using set theory based algorithms and constraints).

The metadata creator 145 can obtain the values to populate a scientific metadata record 165 by processing the corresponding scientific dataset 130. For instance, temporal bounds can be extracted by scanning the date/time values of the scientific dataset 130. The spatial bounds can be expressed in a variety of ways, such as a single set of coordinates for a fixed sensor or, for a mobile sensor, a set of minimum and maximum coordinates or a poly-line. Other bounds can be expressed by a numerical value or value ranges (e.g., temperature, pressure, salinity, acidity, toxicity, radioactivity, etc.). Fuzzy logic principles can be employed in one embodiment, to establish a group of numerical ranges with an expressible label, which is mapped to the numerical range and is therefore its direct equivalent for purposes herein.

It should be understood that the above bounds are for illustrative purposes only and are not intended to be compressive or limiting on the scope of the disclosure. For example, spatial bounds established against the scientific dataset 130 can include, but are not limited to, points, lines, polylines, polygons, or other shapes—beyond the minimum and maximum coordinates. Hence, for a mobile sensor, the system 100 can choose to use min and max coordinates as well as a polyline, at different levels of a hierarchy. In one embodiment, for a scientific model, spatial bounds can represent a three-dimensional complex polygon.

In another contemplated embodiment, the metadata creator 145 can be configured to utilize a hierarchical structure for scientific metadata records 165. The use of a hierarchical structure can allow for the scientific metadata records 165 from one or more scientific datasets 130 to be logically grouped into a metadata collection.

For example, the scientific metadata record 165 for a multi-week data collection ocean cruise can begin with a root metadata record 165 that expresses values for the entirety of the cruise. That root metadata record 165 can then have an associated subset of metadata records 165 that represent each segment or location where data was collected or can represent each week of the cruise, and so on.

The creation of new scientific metadata records 165 by the metadata creator 145 can be triggered manually or performed on a schedule. Depending upon the type of scientific data source 125, access to the scientific datasets 130 can require additional authorization information (i.e., username and password).

A search engine 150 can be configured to identify scientific metadata records 165 that satisfy at least one of the search parameters 170, in whole or in part. That is, since it is desirable to identify datasets that are not necessarily an exact match to the geospatial/temporal search parameters 170, the search engine 150 can return a set of initial scientific metadata records 165 that are somewhat related to the search parameters 170.

In one embodiment, the search engine 150 can automatically convert a non-numerically expressed set of user-entered parameters into the search parameters 170. For example, a user entered term of "salty" relating to water can be automatically translated into a numerical range of salinity, as can terms like "brackish", and "fresh water". These types of conversions can be shorthand ways of expressing commonly utilized numeric parameters 170, which are user configurable in that the ranges mapped to terms can be adjusted for user preference. In another embodiment, a numeric equivalent to a term or set of terms can be presented to user 105 to verify the proper numeric range is being used for the term. Use of mappings may be used in embodiments where non-technical personnel (e.g., managers, general population, etc.) are searching scientific datasets 130. It should be appreciated that scientifically minded users 105 may prefer to work with more precise numerical search parameters 170 (and may disfavor use of approximate terms and mappings from a grammatical expression to a numeric boundary). The disclosure contemplates and supports searches based on either approach, or may provide user interfaces where multiple different manners exist for expressing search parameters 170 or their equivalent.

In a relatively simplistic example, geospatial/temporal search parameters 170 can be entered that request data collected within 5 km of the Astoria Bridge during June of 2009. Initial scientific metadata records 165 returned by the search engine 150 can include all scientific metadata records 165 that are within 5 km of the Astoria Bridge regardless of date as well as scientific metadata records 165 for June of 2009 along the Columbia River. The initial scientific metadata records 165 may exceed the strict parameter boundaries in one embodiment. For example, some records for June 2009 may be returned that are between 5 and 6 KM of the Astoria Bridge, as can some records for May or July of 2009 that are within 1 KM of the Astoria Bridge, as can some records for May or July of 2009 that are between 5 and 6 KM of the Astoria Bridge.

It is important to note that the initial results returned by the search engine 150 are not necessarily the final contents of the proximate dataset results 120. That is, the search engine 150 can aggregate a large set of scientific metadata records 165 that have the potential to be relevant to the search parameters 170. Some of the initial result will most likely be contained in the proximate dataset results 120, while others may be determined to be too far from the search parameters 170.

In an embodiment that utilizes scientific metadata records 165 in the hierarchical structure, root scientific metadata records 165 can be initially assessed and returned by the search engine 150. Based on the assessment of the root records, their corresponding metadata records can be selected, assessed and returned.

Since scientific datasets 130 can contain a large amount of data, querying the actual scientific datasets 130 would require a substantial amount of time, which is the drawback of many conventional search systems. However, the search engine 150 can perform these same queries faster because it searches through the scientific metadata records 165 (i.e., it is faster to find a keyword in a single paragraph than in a page).

To refine the initial results returned by the search engine 150 into the proximate dataset results 120, the proximity score calculator 155 can be used to determine the proximity score 157 for each initial scientific metadata record 165 returned. The proximity score 157 can quantitatively represent the "distance" of an identified scientific metadata record 165 from the search parameters 170. The proximity score 157 can be calculated using a specialized scaling function and can independently evaluate and/or weight a returned scientific metadata record's 165 "distances".

Once the proximity score 157 has been calculated for the initial scientific metadata records 165, the proximate dataset results 120 can be generated by putting the scientific metadata records 165 in descending order by the calculated proximity score 157. Further, a threshold value (not shown) can be used to limit the quantity of records included in the proximate dataset results 120.

In an embodiment that utilizes scientific metadata records 165 in the hierarchical structure, a proximity score 157 can be calculated for each subsequent scientific metadata record 165 of the metadata collection as the contents of the metadata collection are recursively examined.

The proximate dataset results 120 can then be presented to the user 105 in the search tool user interface 115. Using the search tool user interface 115, the user 105 can then be provided with access to the data elements of the scientific dataset 130 that corresponds to a selected proximate dataset result 120.

The search tool user interface 115 can also be configured to support management functions for those users 105 having the authority to modify select operational elements of the dataset search tool 140. For example, a system administrator 105 can be able to access menu options in the search tool user interface 115 to modify the structure of scientific metadata records 165 or the underlying scripts that process the scientific datasets 130.

In another embodiment, auxiliary software applications can be used in the collection and/or presentation of the proximate dataset results 120. For example, the user 105 can enter the geospatial component of the geospatial/temporal search parameters 170 using GOOGLE MAPS. Graphics representing the scientific metadata records 165 contained in the proximate dataset results 120 can then be displayed on the map to visually indicate the physical locations where the data was collected as well as the area defined in the geospatial/temporal search parameters 170.

Network 180 can include any hardware/software/and firmware necessary to convey data encoded within carrier waves. Data can be contained within analog or digital signals and conveyed though data or voice channels. Network 180 can include local components and data pathways necessary for communications to be exchanged among computing device components and between integrated device components and peripheral devices. Network 180 can also include network equipment, such as routers, data lines, hubs, and intermediary servers which together form a data network, such as the Internet. Network 180 can also include circuit-based communication components and mobile communication components, such as telephony switches, modems, cellular communication towers, and the like. Network 180 can include line based and/or wireless communication pathways.

As used herein, presented data store 160 and scientific data sources 125 can be a physical or virtual storage space configured to store digital information. Data store 160 and/or scientific data sources 125 can be physically implemented within any type of hardware including, but not limited to, a magnetic disk, an optical disk, a semiconductor memory, a digitally encoded plastic memory, a holographic memory, or any other recording medium. Data store 160 and/or scientific data sources 125 can be a stand-alone storage unit as well as a storage unit formed from a plurality of physical devices. Additionally, information can be stored within data store 160 and/or scientific data sources 125 in a variety of manners. For example, information can be stored within a database structure or can be stored within one or more files of a file storage system, where each file may or may not be indexed for information searching purposes. Further, data store 160 and/or scientific data sources 125 can utilize one or more encryption mechanisms to protect stored information from unauthorized access.

It should be emphasized, that system 100 contemplates situations where searching of local and/or remote datasets 130 are searched. For example, the dataset 130 being searched can represent content available via the Internet, an Intranet, and the like. The scientific datasets 130 and the metadata records 165 can be distributed across a network space. Further, the scientific datasets 130 and the metadata records 165 can be collocated or can be located in different places.

Figure 2:
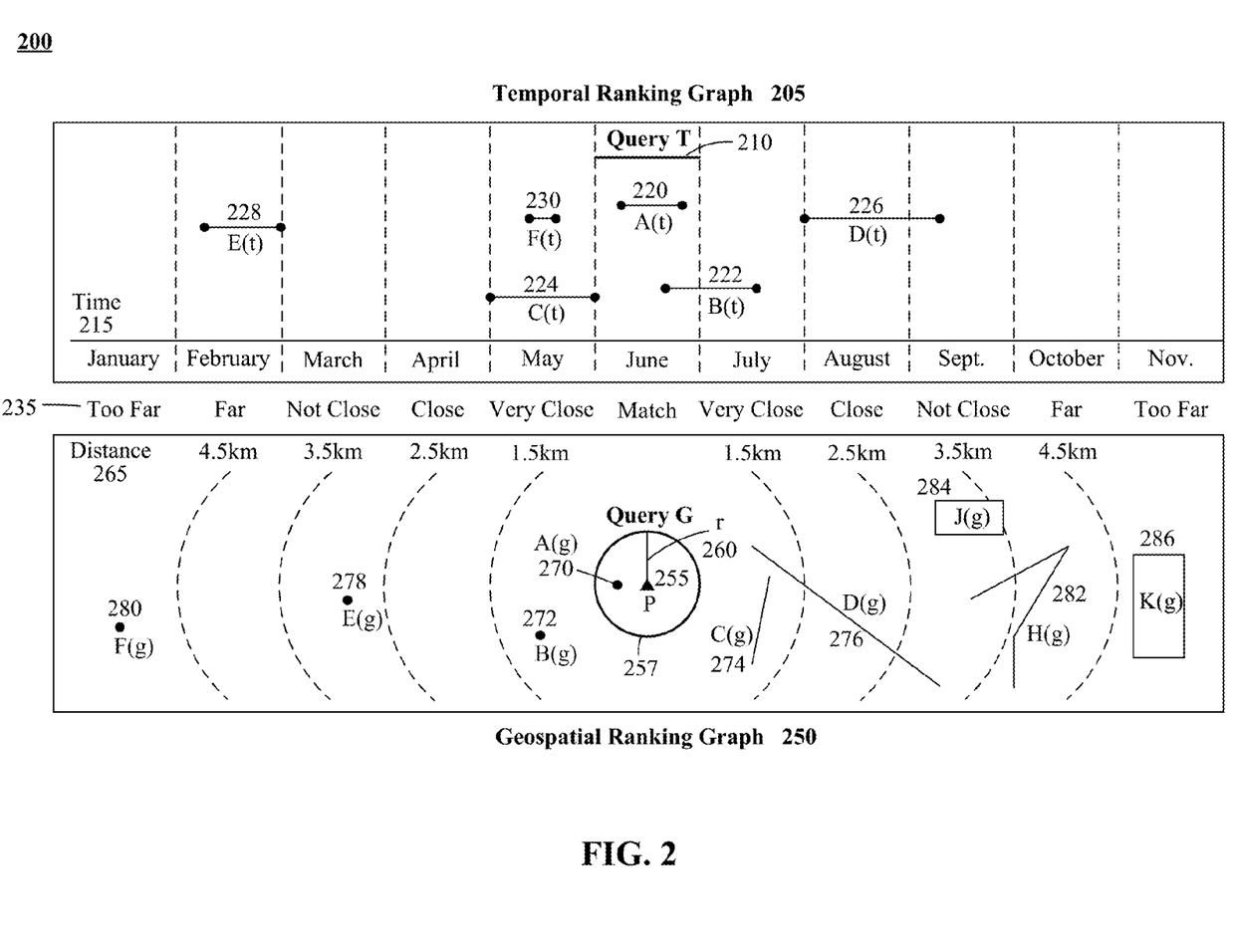
FIG. 2 is an illustration of graphs and depicting a visual representation of the scoring of the temporal and geospatial components of metadata records that match user-entered search parameters in accordance with embodiments of the inventive arrangements disclosed herein.

FIG. 2 is an illustration 200 of graphs 205 and 250 depicting a visual representation of the scoring of the temporal and geospatial components of metadata records that match user-entered search parameters in accordance with embodiments of the inventive arrangements disclosed herein. The graphs 205 and 250 shown in illustration 200 can visually represent operations/functions performed by the scientific dataset search tool 140 of system 100.

The graphs 205 and 250 of illustration 200 can represent the search parameters requesting results for "June within 5 km of P", where P 255 is a specific location. Therefore, as discussed in FIG. 1, the dataset search tool can determine a set of scientific metadata records that have the potential to be relatively close to these search parameters based on a calculated proximity score. The proximity score of the components of these results can be visually illustrated by graphs 205 and 250, respectively.

As used herein, the terms "data" and "dataset" can be used interchangeably because a scientific metadata record can be used to represent a single data point (i.e., the air pressure at Astoria Bridge taken at 20:25 on Jun. 13, 2009) or a series of data points (i.e., the air pressure at Astoria Bridge taken hourly on Jun. 13, 2009).

The temporal component of the search parameters and the relative ranking of the returned scientific metadata records can be shown in the temporal ranking graph 205 and the corresponding geospatial components in the geospatial ranking graph 250. In the temporal ranking graph 205 the temporal search parameter, "June", can be represented as the line Query T 210, spanning the month of June on the time axis 215.

In this example, Query T 210 can be considered to have a center at June $15^{th}$ and a radius of 15 days. Lines A(t) 220, B(t) 222, . . . , E(t) 228 can represent the time spans of the returned scientific metadata records that correspond to datasets A, B, . . . , E. Line A(t) 220 can represent a complete match; all observations in this dataset are from June. The data of line C(t) 224 can span the month of May and, therefore, can be considered to be "very close" to Query T 210 using a qualitative scale 235. Similarly, line B(t) 222 can be considered to be "closer" than line C(t) 224, but not a complete match to Query T 210. Line D(t) 226 can be deemed even further away and line E(t) 228, with data in February, can be considered as "far" from Query T 210.

Geospatial ranking graph 250 can illustrate the geospatial search parameter, P, represented two-dimensionally as the circle Query G 257, having a central point, P 255, and a radius, r 260, of 500 m within which the desired data should fall. As in the temporal ranking graph 205, the point labeled A(g) 270 can represent the geospatial extent of the data in dataset A; a single location like a fixed station or a set of observations made while anchored during a cruise. Since point A(g) 270 falls within the radius of Query G 257, A(g) 270 can be considered a complete match to the geospatial search parameter.

B(g) 272, E(g) 278 and F(g) 280 can also represent single-location datasets further away from the center of Query G 257. Lines C(g) 274 and D(g) 276 can represent transects traveled by a mobile observation station such as a cruise ship, AUV or glider. The polygons J(g) 284 and K(g) 286 can represent the bounding box of a longer, complex cruise track. The qualitative scale 235 can be consistently applied across geometry types, with point B(g) 272 and line C(g) 274 both being considered "very close" and polygon K(g) 286 and point F(g) 280 being considered "too far" from Query G 257.

The distance axis 265 of the geospatial ranking graph 250 and the time axis 215 of the temporal ranking graph 205 can be based upon the limits entered with the geospatial/temporal search parameters. In this example, the geospatial/temporal search parameters have a geospatial limit of "within 5 km" of point P 255. The qualitative scale 235 can be calibrated using a multiple of the limit's radius.

For example, if the user searches for "within ½ km of P", a point occurring at 5 km away from P 255 on the geospatial ranking graph 250 can be considered "too far" away from Query G 257. However, should the user search for "within 5 km of P", as in this example, then the point at 5 km can still have the potential to be a match to Query G 257, but a point at 50 km would be considered "too far".

This approach can allow the scope of the qualitative scale 235 to be dynamically adjusted to the specific search criteria of the user (i.e., an implicit scaling model). The qualitative scale 235 can then be applied to both graphs 205 and 250, providing a common point of reference when examining the distance of plotted datasets from the centers of their respective query 210 and 257. Thus, the temporal data of line F(t) 230 and the spatial data of point B(g) 272 can be both considered as being equidistant from their respective query 210 and 257 centers.

Further, use of the common qualitative scale 235 can facilitate comparisons between datasets when considering both the temporal and spatial distances simultaneously. Dataset F, with temporal data F(t) 230 ("quite close") at location F(g) 280 ("too far"), can be considered, in whole, as further from the geospatial/temporal search parameters than datasets A ("here" in both time and space), B and C ("quite close" in both time and space).

These examples can illustrate the situation of one dataset dominating another: being closer in both time and space. However, the situation can also arise when two datasets need to be ranked, but neither of the datasets dominates the other, such as D and F-F is temporally closer, but D is closer in space. Therefore, to simplify such comparisons, a numeric distance representation can be calculated that uses the query radii as the weighting method between the temporal and geospatial query terms—the proximity score. This same distance concept can be applied to other numerical data (or categorical data) with one or more dimensions.

In essence, the data within a dataset can be thought of as representing a distribution of both temporal and geospatial distances from the query center, with a single point in time or space being the most constrained distribution. Each search parameter itself can also represent a distribution of times and locations. In order to rank the datasets, a single distance measure can be required to characterize the similarity between the dataset and the search parameters.

Many techniques can be used to represent the proximity of two such entities, with varying computational complexities. For example, one commonly used surrogate for the distance between two geographic entities can be the centroid-to-centroid distance. While this technique is a poor approximation when the entities are large and close together, it can be relatively simple to calculate for simple geometries. However, this calculation can ignore the importance of the radii of the geospatial/temporal search parameters, and may not directly identify overlaps between the geometries.

Another distance technique can utilize the minimum (and maximum) distance between two entities. This distance can be estimated by knowing only the bounds of the entities. This latter technique can better suit the requirements for calculating the proximity score (i.e., it can be calculated quickly using the bounds that can be statically determined from a dataset).

Further, this approach can be used to identify key characteristics that will drive calculation of the proximity score: whether a dataset is within, overlaps, or is disjointed with the query bound. The horizontal axis 215 and 265 of each graph 205 and 250 can then be scaled by the radius of the query space attributed to the respective search parameter.

Therefore, the distances of each component of the search parameters can be separately rated from their respective query centers and combined to determine the overall proximity score for the scientific metadata record. Let us begin with mathematically expressing a one-dimensional variable, such as the temporal component of the proximity score in general terms.

It should be understood that the equations and formulas provided herein are for illustrative purposely only and are not intended to be a constraint on the scope of the disclosure. That is, the disclosure can use other functions (than those explicitly expressed herein) that calculate the proximity of the query region and the bounds or footprint in the metadata of a scientific dataset. Additionally, it is expected that minor variants and derivatives (which are considered substantially similar to the equations below) be used in implemented systems. For example, minor variations and derivatives can represent optimizations and adjustments suitable for a specific context of use and/or administrator preferences.

Let $Q_{Tmin}$ and $Q_{Tmax}$ represent the lower and upper bounds of a one-dimensional variable, such as the query time range. Further, let $d_{Tmin}$ and $d_{Tmax}$ represent the minimum and maximum times of the data in dataset d. For calculation purposes in the example of using time, all times can be translated into a monotonically increasing real number, for example "Unix time". The equation below (Equation 1) can calculate $d_{Rmin}$, the distance of dataset d's minimum time from the temporal query "center" (i.e., the mean of $Q_{Tmin}$ and $Q_{Tmax}$), then scales the result by the size of the query "radius" (i.e., half its range).

$$d_{Rmin} = \frac{d_{Tmin} - ((Q_{Tmax} - Q_{Tmin})/2 + Q_{Tmin})}{(Q_{Tmax} - Q_{Tmin})/2} \quad [1]$$
$$= (2d_{Tmin} - Q_{Tmax} - Q_{Tmin})/(Q_{Tmax} - Q_{Tmin})$$

Similarly, Equation 2 can calculate $d_{Rmax}$, the "scaled time-range distance" of the dataset's maximum time.

$$d_{Rmax} = (2d_{Tmax} - Q_{Tmax} - Q_{Tmin})/(Q_{Tmax} - Q_{Tmin}) \quad [2]$$

Equation 3 can then calculate the overall temporal distance, $d_{Tdist}$, for the dataset from the query corresponding to the temporal search parameter.

$$d_{Tdist} = \begin{cases} 0 & d_{Tmin} \geq Q_{Tmin}, d_{Tmax} \leq Q_{Tmax} \quad (A) \\ \frac{(|d_{Rmax}| - 1)^2}{2|d_{Rmax} - d_{Rmin}|} & d_{Tmin} \geq Q_{Tmin}, d_{Tmax} > Q_{Tmax} \quad (B) \\ \frac{(|d_{Rmin}| - 1)^2}{2|d_{Rmax} - d_{Rmin}|} & d_{Tmin} < Q_{Tmin}, d_{Tmax} \leq Q_{Tmax} \quad (C) \\ \frac{(|d_{Rmax}| - 1)^2 + (|d_{Rmin}| - 1)^2}{2|d_{Rmax} - d_{Rmin}|} & d_{Tmin} < Q_{Tmin}, d_{Tmax} > Q_{Tmax} \quad (D) \\ (|d_{Rmin} + d_{Rmax}|/2) - 1 & d_{Tmin} > Q_{Tmin} \text{ or } d_{Tmax} < Q_{Tmax} \quad (E) \end{cases} \quad [3]$$

In Equation 3, case A can account for a dataset that is completely within the query range; cases B, C, and D can account for a dataset that overlaps the query range above, below, and on both sides; and case E can account for a dataset that is completely outside of the query range.

Next, Equation 4 can represent the calculation of the temporal component of the proximity score, $d_{Ts}$, for this dataset by applying a scaling function, s, to $d_{Tdist}$. The scaling function, s, can be used to convert the calculated distance from the query center, $d_{Tdist}$, into a numerical value.

For example, s can be expressed as $(100-f^*d_{Tdist})$, where f can represent the maximum distance from the query center for a dataset to be considered "too far" on the qualitative scale 235. Thus, regardless of the value of f, a complete match can result in s=100, since $d_{Tdist}=0$; other results can be decreasingly scaled with respect to $d_{Tdist}$ and f.

$$d_{Ts} = s(d_{Tdist}) \quad [4]$$

Additionally, the geospatially/temporally proximate dataset search tool can be configured to allow the scaling function, s, to be configurable for different users and/or different tasks.

The expression for a geospatial component can be similar to that of the temporal component. Let C represent the center location 255 of the geospatial query 257 and r 260 the radius. The locations of the data within a single dataset, d, can be represented by a single geometry, g. This geometry can be a point, line (or poly-line), or polygon.

The variables $d_{Gmin}$ and $d_{Gmax}$ can represent the minimum and maximum distances of the geometry from C, using a distance measure such as Euclidean distance. Then, Equation 5 can be used to calculate the overall distance measure, $d_{Gdist}$.

$$d_{Gdist} = \begin{cases} 0 & d_{Gmax} \leq r \quad (A) \\ \frac{(d_{Gmax}/r - 1)^2}{2(d_{Gmax} - d_{Gmin})/r} & d_{Gmin} \leq r, d_{Gmax} \geq r \quad (B) \\ (d_{Gmin} + d_{Gmax})/r - 1 & d_{Gmin} > r \quad (C) \end{cases} \quad [5]$$

Case A of Equation 5 can represent when the dataset is completely within the query radius; case B can represent when the dataset overlaps the query circle 257; and, case C can indicate that the dataset is completely outside the query circle 257.

Equation 6 can represent the calculation of the geospatial component of the proximity score, $d_{Gs}$, for dataset d by again applying the scaling function, s, to the calculated overall distance measure, $d_{Gdist}$.

$$d_{Gs} = s(d_{Gdist}) \quad [6]$$

In Equation 7, the geospatial component, $d_{Gs}$, and the temporal component, $d_{Ts}$, can be combined to produce the proximity score, $d_{PR}$, for the dataset. In this example, the geospatial and temporal components can be averaged.

$$d_{PR} = (d_{Gs} + d_{Ts})/(\text{\# of query components}) \quad [7]$$

In the above equation, the divisor is the number of number of query components—of which in the provided example, equals 2 (space+time).

It should be noted that since each component of the proximity score is scaled separately, the user can adjust the relative importance of each component with respect to their query by modifying the corresponding search parameters. That is, if in our example it is important for the datasets to be very close to the geospatial search parameter, then the user can reduce the value of the geospatial limit and/or the value of f used in the scaling function, s, for the calculation of the geospatial component of the proximity score, if allowed.

It should be emphasized that nothing is unique about geospatial and/or temporal dimensions, and similar graphs and analysis can be performed for other search parameters. Additionally, the above equations can be utilized to determine a distance between any numeric search parameter and use of geospatial and temporal values in examples are for illustrative purposes only and are not to be construed as a limitation of the disclosure.

Figure 3:
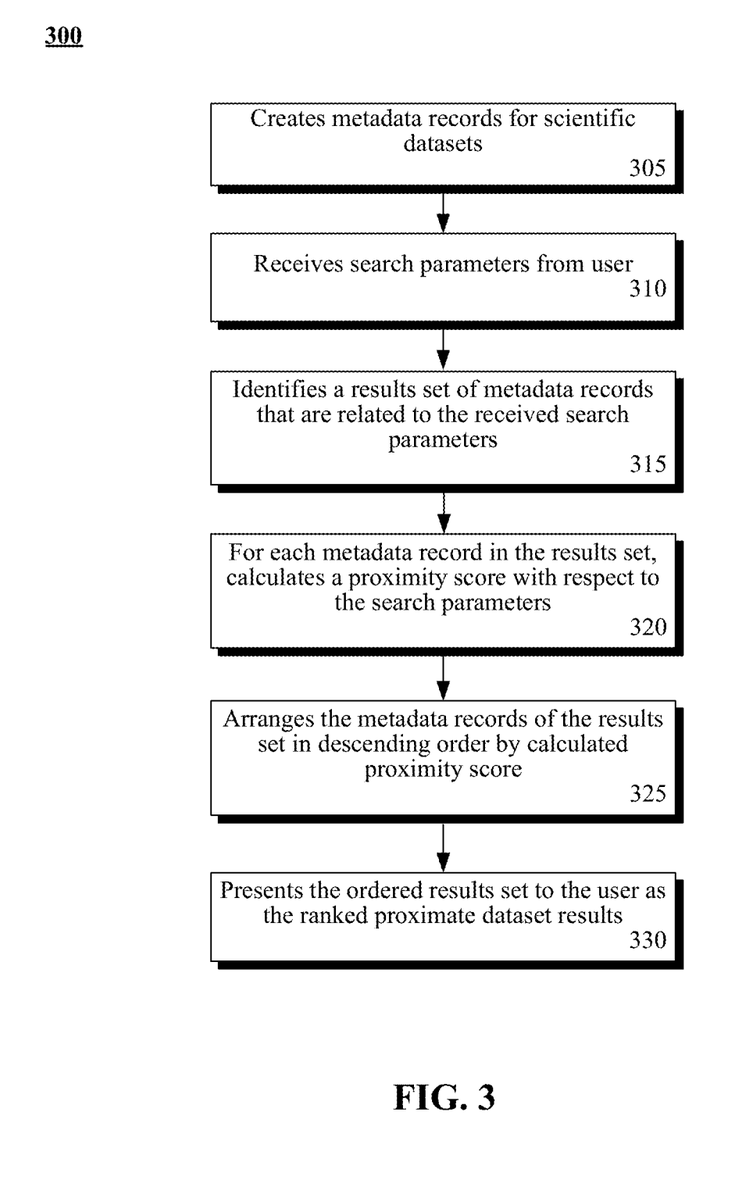
FIG. 3 is a flow chart of a method describing the basic operation of the scientific dataset search tool in accordance with embodiments of the inventive arrangements disclosed herein.

FIG. 3 is a flow chart of a method 300 describing the basic operation of the scientific dataset search tool in accordance with embodiments of the inventive arrangements disclosed herein. Method 300 can be performed within the context of system 100.

Method 300 can begin in step 305 where the scientific dataset search tool can create the metadata records for the scientific datasets. Step 305 can be triggered manually or can occur automatically in response to a scheduled event (i.e., script).

Search parameters can then be received via the search tool user interface from the user in step 310. Then, in step 315, a results set of metadata records can be identified that are related to the received search parameters.

For each record in the results set, a proximity score can be calculated with respect to the search parameters in step 320. Step 320 can utilize Equations 1-7 discussed in FIG. 2. It should be appreciated that the Equations 1-7 are provided to illustrate the concepts expressed herein and that derivatives and alternative calculations are to be considered within scope of the disclosure.

In step 325, the records of the results set can then be arranged in descending order by their calculated proximity score. The ordered results can be presented to the user as the proximate dataset results in step 330. Alternatively, the calculated proximity score can be used to filter the results (as opposed to ordering them relative to each other).

Figure 4:
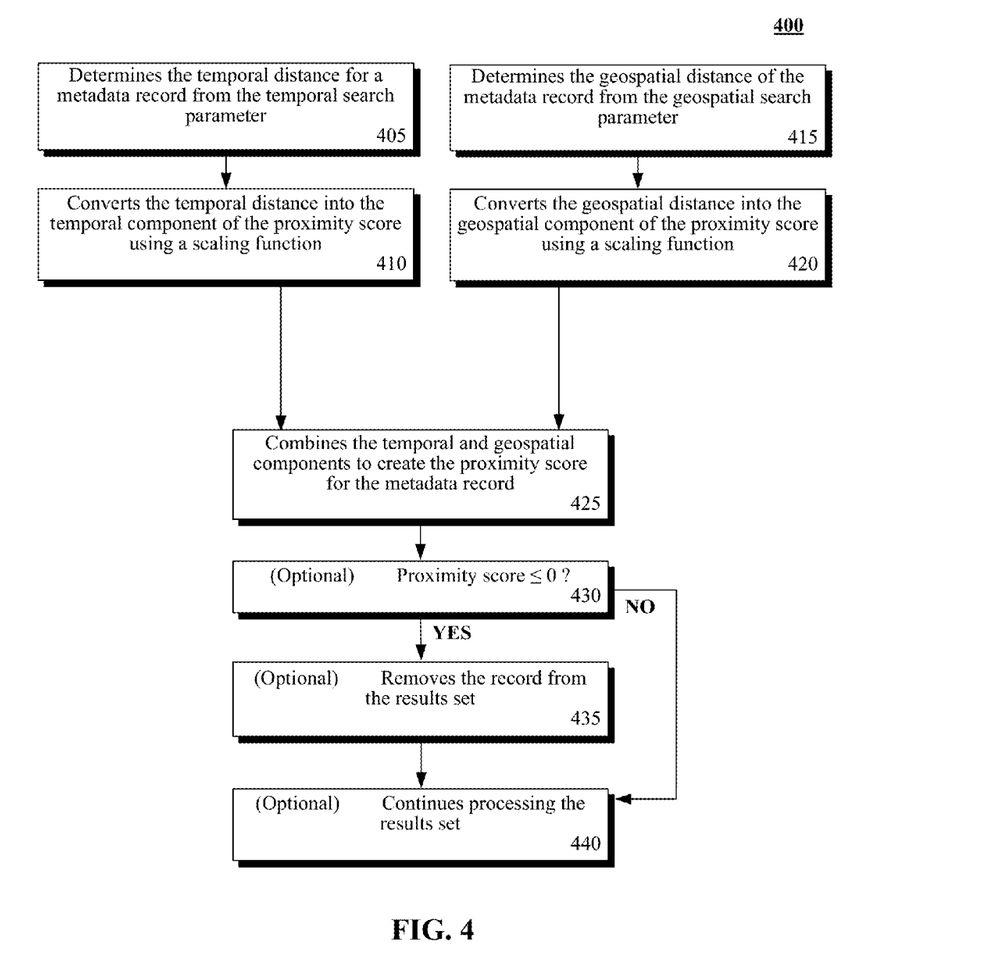
FIG. 4 is a flow chart of a method detailing the calculation of the proximity score in accordance with embodiments of the inventive arrangements disclosed herein.

FIG. 4 is a flow chart of a method 400 detailing the calculation of the proximity score in accordance with embodiments of the inventive arrangements disclosed herein. Method 400 can be performed within the context of system 100, and/or in conjunction with method 300. Method 400 can further utilize the equations (Equations 1-7) discussed in FIG. 2. In method 400, geospatial and temporal parameters are focused upon, but it should be understood the method 400 can function with any set (1 . . . N) of search parameters, as defined herein.

Method 400 can begin in step 405 where the scientific dataset search tool can determine the temporal distance, $d_{Tdist}$, of a metadata record from the temporal search parameter. Step 405 can utilize Equations 1-3 from the discussion of FIG. 2. The temporal distance, $d_{Tdist}$, can then be converted into the temporal component of the proximity score using a scaling function, s, in step 410.

In step 415, the geospatial distance, $d_{Gdist}$, of the metadata record from the geospatial search parameter can be calculated. The geospatial distance, $d_{Gdist}$, can then be converted into the geospatial component of the proximity score using a scaling function, s, in step 420.

In step 425, the temporal and geospatial components can be combined to create the proximity score for the metadata record. It can optionally be determined if the proximity score is less than or equal to zero in step 430.

In one embodiment, when the proximity score is less than or equal to zero, step 435 can execute where the metadata record can be removed from the results set (i.e., the metadata record is considered to be too far away from the geospatial/temporal search parameters to be of interest to the user). Upon completion of step 435 or when the proximity score is greater than zero, processing of the other metadata records of the results set can continue in step 440.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing proximate dataset recommendations comprising:
   creating of a plurality of metadata records that correspond to a plurality of datasets representing scientific data by a scientific dataset search tool, wherein said plurality of metadata records conform to a standardized structural definition, wherein values for data elements of a metadata record are contained within a corresponding dataset;
   identifying at least one metadata record from the plurality of metadata records having a value that is proximate to one or more user-entered search parameters, wherein one of the search parameters is a temporal parameter, wherein proximity is determined with respect to a range represented by the corresponding user-entered search parameters;
   calculating a proximity score for each identified metadata record, wherein said proximity score expresses a relevance of the corresponding dataset to the user-entered search parameters, wherein calculating the proximity score comprises calculating a temporal proximity score, wherein calculating the temporal proximity score further comprises:
      determining a temporal distance, $d_{Tdist}$, from a central point of the user-entered temporal search parameter for the dataset using the following formula or a variation or derivative thereof:

$$d_{Tdist} = \begin{cases} 0 & d_{Tmin} \geq Q_{Tmin}, d_{Tmax} \leq Q_{Tmax} \\ \dfrac{(|d_{Rmax}| - 1)^2}{2|d_{Rmax} - d_{Rmin}|} & d_{Tmin} \geq Q_{Tmin}, d_{Tmax} > Q_{Tmax} \\ \dfrac{(|d_{Rmin}| - 1)^2}{2|d_{Rmax} - d_{Rmin}|} & d_{Tmin} < Q_{Tmin}, d_{Tmax} \leq Q_{Tmax} \\ \dfrac{(|d_{Rmax}| - 1)^2 + (|d_{Rmax}| - 1)^2}{2|d_{Rmax} - d_{Rmin}|} & d_{Tmin} < Q_{Tmin}, d_{Tmax} > Q_{Tmax} \\ (|d_{Rmin} + d_{Rmax}|/2) - 1 & d_{Tmin} > Q_{Tmin} \text{ or } d_{Tmax} < Q_{Tmax}, \end{cases}$$

wherein $Q_{Tmin}$ and $Q_{Tmax}$ represent the minimum and maximum bounds of the temporal search parameter range, $d_{Tmin}$ and $d_{Tmax}$ represent the minimum and maximum time values of the dataset, and $d_{Rmin}$ and $d_{Rmax}$ represent the distance of $d_{Tmin}$ and $d_{Tmax}$ from the central point of the range; and
   using the proximity score to filter or order metadata records to create a listing of dataset results.

2. The method of claim 1, further comprising:
   arranging the at least one identified metadata record in descending order by the calculated proximity rating, wherein said arranged metadata records create a listing of proximate dataset results; and
   presenting the proximate dataset results within a user interface.

3. The method of claim 1, wherein the user-entered search parameters comprise a geospatial parameter.

4. The method of claim 1, wherein the user-entered search parameters comprise a numeric range or a non-numeric parameter or keyword that can be translated to a numeric range.

5. The method of claim 1, wherein creating the plurality of metadata records further comprises:
  accessing a data store storing a dataset;
  extracting from the dataset values for metadata record data elements, wherein the values comprise at least temporal bounds of the dataset, geospatial bounds of the dataset, and a unique identifier for the proximate dataset result;
  populating a new metadata record with the extracted values; and
  storing the new metadata record in a data store accessible by the geospatially/temporally proximate dataset search tool.

6. The method of claim 1, wherein calculating the proximity score for each identified metadata record further comprises:
  calculating the temporal proximity score for the identified metadata record, wherein said temporal proximity score is weighted based upon a radius of a range expressed by the user-entered temporal search parameter;
  calculating a geospatial proximity score for the identified metadata record, wherein said geospatial proximity score is weighted based upon a radius of a range expressed by the user-entered geospatial search parameter; and
  combining the temporal proximity score and the geospatial proximity score into the proximity score.

7. The method of claim 1, further comprising:
  converting the determined $d_{Tdist}$ to the temporal proximity score, $d_{Ts}$, using $$d_{Ts} = s(d_{Tdist}),$$

wherein s is a scaling function that translates $d_{Tdist}$ into a value within a scale defined for the proximity score.

8. The method of claim 1, wherein one of the search parameters is a geospatial parameter, and wherein calculating the proximity score comprises calculating a geospatial proximity score.

9. The method of claim 8, wherein calculating the geospatial proximity score further comprises:
  determining a geospatial distance, $d_{Gdist}$, from a central point of the user-entered geospatial search parameter for the dataset using the following formula or a variation or derivative thereof:

$$d_{Gdist} = \begin{cases} 0 & d_{Gmax} \leq r \\ \frac{(d_{Gmax}/r - 1)^2}{2(d_{Gmax} - d_{Gmin})/r} & d_{Gmin} \leq r, d_{Gmax} \geq r \\ (d_{Gmin} + d_{Gmax})/r - 1 & d_{Gmin} > r, \end{cases}$$

wherein r is the radius of the range expressed by the user-entered geospatial search parameter and $d_{Gmin}$ and $d_{Gmax}$ are the minimum and maximum distances within the dataset from the central point.

10. The method of claim 9, further comprising:
  converting the determined $d_{Gdist}$ to the geospatial proximity score, $d_{Gs}$, using $$d_{Gs} = s(d_{Gdist}),$$

wherein s is a scaling function that translates $d_{Gtdist}$ into a value within a scale defined for the proximity score.

11. The method of claim 1, wherein the proximity score utilizes a scale having a lower bound and an upper bound denoting a distant match and an exact match 0, respectively, to the user-entered geospatial and temporal search parameters.

12. The method of claim 11, further comprising:
  arranging the at least one identified metadata record in descending order by the calculated proximity score, wherein said arranged metadata records create a listing of proximate dataset results, wherein said arranging of the at least one identified metadata record further comprises: and
  comparing the calculated proximity score of the at least one identified metadata record to the lower bound of the scale.

13. The method of claim 1, wherein the scientific dataset search tool is a component of a data analysis system.

14. The method of claim 1, wherein the standardized structural definition of the plurality of metadata records utilizes a hierarchical configuration in which metadata records are able to be nested within a superior metadata record.

15. The method of claim 1, wherein the user-entered search parameters include at least one limiting value for at least one of the user-entered search parameters, wherein the calculated proximity score is further scaled with respect to the at least one limiting value.

16. A method for providing proximate dataset recommendations comprising:
  creating of a plurality of metadata records that correspond to a plurality of datasets representing scientific data by a scientific dataset search tool, wherein said plurality of metadata records conform to a standardized structural definition, wherein values for data elements of a metadata record are contained within a corresponding dataset;
  identifying at least one metadata record from the plurality of metadata records having a value that is proximate to one or more user-entered search parameters, wherein proximity is determined with respect to a range represented by the corresponding user-entered search parameters, wherein one of the search parameters is a geospatial parameter;
  calculating a proximity score for each identified metadata record, wherein said proximity score expresses a relevance of the corresponding dataset to the user-entered search parameters, wherein calculating the proximity score comprises calculating a geospatial proximity score, wherein calculating the geospatial proximity score further comprises:
    determining a geospatial distance, $d_{Gdist}$, from a central point of the user-entered geospatial search parameter for the dataset using the following formula or a variation or derivative thereof:

$$d_{Gdist} = \begin{cases} 0 & d_{Gmax} \leq r \\ \frac{(d_{Gmax}/r - 1)^2}{2(d_{Gmax} - d_{Gmin})/r} & d_{Gmin} \leq r, d_{Gmax} \geq r \\ (d_{Gmin} + d_{Gmax})/r - 1 & d_{Gmin} > r, \end{cases}$$

wherein r is the radius of the range expressed by the user-entered geospatial search parameter and $d_{Gmin}$ and $d_{Gmax}$ are the minimum and maximum distances within the dataset from the central point; and
  using the proximity score to filter or order metadata records to create a listing of dataset results.

17. The method of claim 16, further comprising:
  converting the determined $d_{Gdist}$ to the geospatial proximity score, $d_{Gs}$, using $$d_{Gs} = s(d_{Gdist}),$$

wherein s is a scaling function that translates $d_{Gdist}$ into a value within a scale defined for the proximity score.

18. The method of claim 16, further comprising:
arranging the at least one identified metadata record in descending order by the calculated proximity rating, wherein said arranged metadata records create a listing of proximate dataset results; and
presenting the proximate dataset results within a user interface.

19. The method of claim 16, wherein the user-entered search parameters comprise a temporal parameter.

20. The method of claim 16, wherein the user-entered search parameters comprise a numeric range or a non-numeric parameter or keyword that can be translated to a numeric range.

21. A computer program product comprising:
a non-transitory computer usable storage medium storing computer usable program code executable by one or more processors, the computer usable program code comprising:
computer usable program code configured to create of a plurality of metadata records that correspond to a plurality of datasets representing scientific data by a scientific dataset search tool, wherein said plurality of metadata records conform to a standardized structural definition, wherein values for data elements of a metadata record are contained within a corresponding dataset;
computer usable program code configured to identify at least one metadata record from the plurality of metadata records having a value that is proximate to one or more user-entered search parameters, wherein one of the search parameters is a temporal parameter, wherein proximity is determined with respect to a range represented by the corresponding user-entered search parameters;
computer usable program code configured to calculate a proximity score for each identified metadata record, wherein said proximity score expresses a relevance of the corresponding dataset to the user-entered search parameters, wherein calculating the proximity score comprises calculating a temporal proximity score, wherein the computer usable code to calculate the temporal proximity score is further configured to:
determine a temporal distance, $d_{Tdist}$, from a central point of the user-entered temporal search parameter for the dataset using the following formula or a variation or derivative thereof:

$$d_{Tdist} = \begin{cases} 0 & d_{Tmin} \geq Q_{Tmin}, d_{Tmax} \leq Q_{Tmax} \\ \frac{(|d_{Rmax}|-1)^2}{2|d_{Rmax}-d_{Rmin}|} & d_{Tmin} \geq Q_{Tmin}, d_{Tmax} > Q_{Tmax} \\ \frac{(|d_{Rmin}|-1)^2}{2|d_{Rmax}-d_{Rmin}|} & d_{Tmin} < Q_{Tmin}, d_{Tmax} \leq Q_{Tmax} \\ \frac{(|d_{Rmax}|-1)^2+(|d_{Rmax}|-1)^2}{2|d_{Rmax}-d_{Rmin}|} & d_{Tmin} < Q_{Tmin}, d_{Tmax} > Q_{Tmax} \\ (|d_{Rmin}+d_{Rmax}|/2)-1 & d_{Tmin} > Q_{Tmin} \text{ or } d_{Tmax} < Q_{Tmax}, \end{cases}$$

wherein $Q_{Tmin}$ and $Q_{Tmax}$ represent the minimum and maximum bounds of the temporal search parameter range, $d_{Tmin}$ and $d_{Tmax}$ represent the minimum and maximum time values of the dataset, and $d_{Rmin}$ and $d_{Rmax}$ represent the distance of $d_{Tmin}$ and $d_{Tmax}$ from the central point of the range; and computer usable program code configured to use the proximity score to filter or order metadata records to create a listing of dataset results.

22. The computer program product of claim 21, the computer usable program code further comprising:
computer usable program code configured to convert the determined $d_{Tdist}$ to the temporal proximity score, $d_{Ts}$, using $$d_{Ts}=s(d_{Tdist}),$$

wherein s is a scaling function that translates $d_{Tdist}$ into a value within a scale defined for the proximity score.

23. A computer program product comprising:
a non-transitory computer usable storage medium storing computer usable program code executable by one or more processors, the computer usable program code comprising:
computer usable program code configured to create of a plurality of metadata records that correspond to a plurality of datasets representing scientific data by a scientific dataset search tool, wherein said plurality of metadata records conform to a standardized structural definition, wherein values for data elements of a metadata record are contained within a corresponding dataset;
computer usable program code configured to identify at least one metadata record from the plurality of metadata records having a value that is proximate to one or more user-entered search parameters, wherein proximity is determined with respect to a range represented by the corresponding user-entered search parameters, wherein one of the search parameters is a geospatial parameter;
computer usable program code configured to calculate a proximity score for each identified metadata record, wherein said proximity score expresses a relevance of the corresponding dataset to the user-entered search parameters, wherein calculating the proximity score comprises calculating a geospatial proximity score, wherein the computer usable program code configured to calculate the geospatial proximity score further comprises:
computer usable program code configured to determine a geospatial distance, $d_{Gdist}$, from a central point of the user-entered geo spatial search parameter for the dataset using the following formula or a variation or derivative thereof:

$$d_{Gdist} = \begin{cases} 0 & d_{Gmax} \leq r \\ \frac{(d_{Gmax}/r-1)^2}{2(d_{Gmax}-d_{Gmin})/r} & d_{Gmin} \leq r, d_{Gmax} \geq r \\ (d_{Gmin}+d_{Gmax})/r-1 & d_{Gmin} > r, \end{cases}$$

wherein r is the radius of the range expressed by the user-entered geospatial search parameter and $d_{Gmin}$ and $d_{Gmax}$ are the minimum and maximum distances within the dataset from the central point; and
computer usable program code configured to use the proximity score to filter or order metadata records to create a listing of dataset results.

24. The computer program product of claim 23, the computer usable program code further comprising:
computer usable program code configured to convert the determined $d_{Gdist}$ to the geospatial proximity score, $d_{Gs}$, using $$d_{Gs}=s(d_{Gdist}),$$

wherein s is a scaling function that translates $d_{Gdist}$ into a value within a scale defined for the proximity score.

25. A system comprising:
one or more processors;
at least one non-transitory computer usable storage medium storing computer usable program code executable by the one or more processors, the computer usable program code comprising:
computer usable program code configured to create of a plurality of metadata records that correspond to a plurality of datasets representing scientific data by a scientific dataset search tool, wherein said plurality of metadata records conform to a standardized structural definition, wherein values for data elements of a metadata record are contained within a corresponding dataset;
computer usable program code configured to identify at least one metadata record from the plurality of metadata records having a value that is proximate to one or more user-entered search parameters, wherein proximity is determined with respect to a range represented by the corresponding user-entered search parameters, wherein one of the search parameters is a geospatial parameter;
computer usable program code configured to calculate a proximity score for each identified metadata record, wherein said proximity score expresses a relevance of the corresponding dataset to the user-entered search parameters, wherein calculating the proximity score comprises calculating a geospatial proximity score, wherein the computer usable program code configured to calculate the geospatial proximity score further comprises:
computer usable program code configured to determine a geospatial distance, $d_{Gdist}$, from a central point of the user-entered geo spatial search parameter for the dataset using the following formula or a variation or derivative thereof:

$$d_{Tdist} = \begin{cases} 0 & d_{Tmin} \geq Q_{Tmin}, d_{Tmax} \leq Q_{Tmax} \\ \frac{(|d_{Rmax}|-1)^2}{2|d_{Rmax}-d_{Rmin}|} & d_{Tmin} \geq Q_{Tmin}, d_{Tmax} > Q_{Tmax} \\ \frac{(|d_{Rmin}|-1)^2}{2|d_{Rmax}-d_{Rmin}|} & d_{Tmin} < Q_{Tmin}, d_{Tmax} \leq Q_{Tmax} \\ \frac{(|d_{Rmax}|-1)^2 + (|d_{Rmax}|-1)^2}{2|d_{Rmax}-d_{Rmin}|} & d_{Tmin} < Q_{Tmin}, d_{Tmax} > Q_{Tmax} \\ (|d_{Rmin}+d_{Rmax}|/2)-1 & d_{Tmin} > Q_{Tmin} \text{ or } d_{Tmax} < Q_{Tmax}, \end{cases}$$

wherein r is the radius of the range expressed by the user-entered geospatial search parameter and $d_{Gmin}$ and $d_{Gmax}$ are the minimum and maximum distances within the dataset from the central point; and
computer usable program code configured to use the proximity score to filter or order metadata records to create a listing of dataset results.

26. The system of claim 25, the computer usable program code further comprising:
computer usable program code configured to convert the determined $d_{Gdist}$ to the geospatial proximity score, $d_{Gs}$, using $$d_{Gs} = s(d_{Gdist}),$$

wherein s is a scaling function that translates $d_{Gdist}$ into a value within a scale defined for the proximity score.

* * * * *